Figure 1:
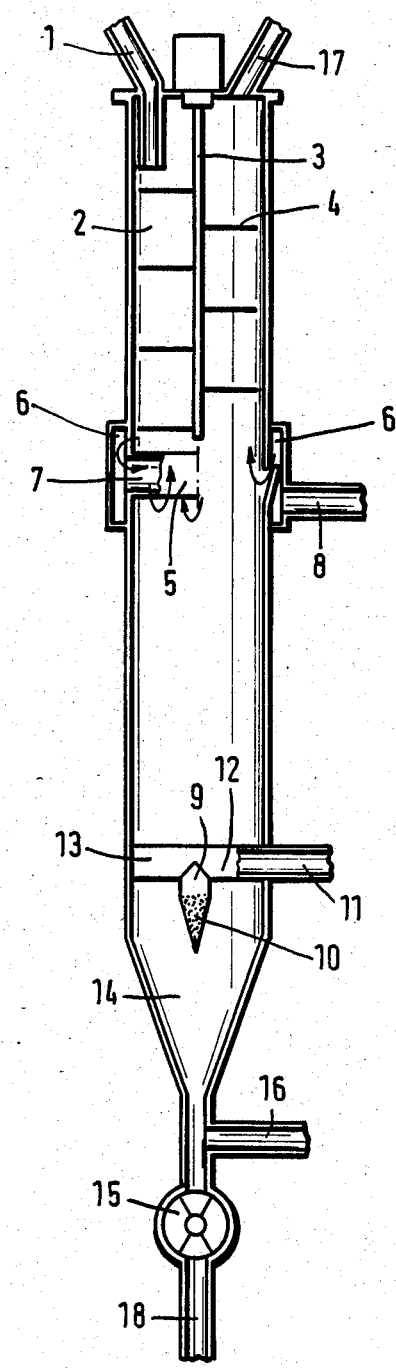

United States Patent [19]

Gerking et al.

[11] Patent Number: 4,584,366

[45] Date of Patent: Apr. 22, 1986

[54] PROCESS FOR THE CRYSTALLIZING, DRYING AND AFTERCONDENSATION OF POLYCONDENSATES

[75] Inventors: Lüder Gerking; Dieter O. Taurat, both of Berlin, Fed. Rep. of Germany

[73] Assignee: Karl Fischer Industrieanlagen GmbH, Berlin, Fed. Rep. of Germany

[21] Appl. No.: 683,963

[22] Filed: Dec. 20, 1984

Related U.S. Application Data

[63] Continuation of Ser. No. 480,598, Mar. 30, 1983, abandoned.

[30] Foreign Application Priority Data

Apr. 2, 1982 [DE] Fed. Rep. of Germany ....... 3213025

[51] Int. Cl.$^4$ ...................... C08G 63/70; C08G 63/74
[52] U.S. Cl. .................................... 528/502; 528/272; 528/480; 528/483
[58] Field of Search ................ 528/272, 480, 483, 502

[56] References Cited

U.S. PATENT DOCUMENTS

| | | | |
|---|---|---|---|
| 476,891 | 6/1892 | Morrell | 159/16 R |
| 1,880,925 | 10/1932 | Eissner | 159/16 R |
| 3,253,892 | 5/1966 | Brignac et al. | 159/DIG. 10 |
| 3,493,553 | 2/1970 | Hinton | 159/DIG. 10 |
| 3,821,171 | 6/1974 | Beaton . | |
| 4,130,456 | 12/1978 | Itoh et al. | 159/DIG. 10 |
| 4,168,373 | 9/1979 | Nickerson et al. | 159/DIG. 10 |
| 4,226,973 | 10/1980 | Malo et al. | 528/480 |
| 4,230,819 | 10/1980 | Hauenstein et al. | 528/483 |
| 4,260,721 | 4/1981 | Ford et al. | 528/272 |
| 4,271,287 | 6/1981 | Shah | 528/272 |
| 4,340,721 | 7/1982 | Bonnebat et al. | 528/272 |
| 4,374,975 | 2/1983 | Duh | 528/272 |
| 4,446,303 | 5/1984 | Moore et al. | 528/308.2 |

FOREIGN PATENT DOCUMENTS

| | | |
|---|---|---|
| 2559290 | 7/1977 | Fed. Rep. of Germany . |
| 2558730 | 7/1977 | Fed. Rep. of Germany . |
| 2642102 | 3/1978 | Fed. Rep. of Germany . |
| 2723549 | 12/1978 | Fed. Rep. of Germany . |

*Primary Examiner*—Lucille M. Phynes
*Attorney, Agent, or Firm*—Brooks Haidt Haffner & Delahunty

[57] ABSTRACT

Described are a process and an apparatus for the aftercondensation of polycondensates, wherein moist and amorphous polymer in a granular or powderous form is continuously introduced from above into a single reactor. The granulate flows downward under gravity, with a hot gas being caused to flow in counter-current relation thereto. The reactor is formed as a continuous shaft or column which has positioned in the upper portion thereof an agitating element acting to prevent agglutination of the granulate. The granulate is crystallized and pre-dried in the upper portion of the shaft or column. In a further (subsequent) portion of the shaft or column, drying and aftercondensation take place without separation from the remainder of the shaft or column.

6 Claims, 2 Drawing Figures

PROCESS FOR THE CRYSTALLIZING, DRYING AND AFTERCONDENSATION OF POLYCONDENSATES

CROSS REFERENCE TO RELATED APPLICATION

This application is a continuation of application Ser. No. 480,598 filed Mar. 30, 1983, now abandoned.

The present invention relates to a process for the aftercondensation of polycondensates and to an apparatus for performing the aftercondensation of polymers, especially polyesters, such as polyethyleneterephthalate (PET), and polyamides 6 and 66. The aftercondensation of polymers is recently applied more frequently on an industrial scale in the preparation of suitable primary (or starting) materials for high-strength technical threads or yarns and hollow articles. The latter include mainly bottles made of PET for carbon dioxide-containing liquids.

In carrying out the aftercondensation in solid phase, there are generally encountered two problems to which the apparatus and the process conditions must be accommodated: Agglutination of the granulate by partial melting of amorphous components at a temperature far below the actual melting point, particularly in the case of polyesters, when the granulate is not or only slightly crystallized; and the removal of gaseous reaction products, primarily aldehydes in the case of polyesters. These reaction products must be removed when the bottles produced from the granulate are intended for containing beverages or other foodstuffs, because the aldehydes may affect the taste.

The solid condensation of the abovementioned polymers which are generally present in the form of a granulate, can be easily performed in rotary drum-type driers as are extensively used in the form of eccentric tumbling driers. The retention time of all granulate particles is strictly equal, and any tendencies toward agglutination can be minimized by the continuous agitation of the content of the drum, while escaping reaction gases, such as aldehydes, may be removed by the application of a vacuum or by inert gas purging. However, a drawback of these proven devices resides in the fact that they can be operated only in discontinuous fashion, in addition to the vigorous agitation of the granulate and the resulting dust formation by abrasion. This fact necessarily implies high energy consumption due to the alternating heating and cooling cycles. Further, devices of this type involve high prime cost and require relatively high maintenance and personal costs in operation. On the other hand, a simple shaft or column, as proposed by U.S. Pat. No. 3,821,171 for the treatment of polyester, because the risk of agglomeration of the granulate in the upper portion of the drier is very high owing to the high agglutination tendency of amorphous or slightly crystallized polymer.

Prior processes, such as those according to DE-AS No. 26 42 102 and DE-AS No. 25 58 730, in which an agglomeration of the PET is willfully tolerated, and such agglomeration is broken up by crushing and/or peeling devices in the discharge section of the apparatus, are not suitable for performing economical continuous operation due to the extremely high energy consumption, the high degree of dust formation and the high maintenance requirements.

Accordingly, processes have been proposed in which the polymer granulate is first pre-crystallized and then continuously recondensed in solid phase under the action of a hot gas stream, most frequently comprising inert gas.

Processes of this kind are described in DE-AS No. 25 29 290 and German Pat. No. 22 12 768. In these processes, precrystallization is intended to take place in a fluidized bed. As known, however, the fluidized bed suffers from the drawback that the polymer particles are subject to greatly different retention periods and the entire process requires a relatively high amount of energy. The most serious drawback, however, resides in the fact that at least two apparatus units are required, this inevitably resulting in increased investment cost, unnecessary complication of the system structure, and impairment of the retention time distribution of the granulate in the transfer from one process stage to the next one.

Thus, it has further been proposed in DE-OS No. 27 23 549 to use a shaft-type or columnar apparatus only, and to eliminate the agglutination tendency by having wire mesh nettings arranged therein transversely to the primary direction of flow of the granulate. In this instance, however, the aperture or mesh width and the spacing between the (wire mesh) planes are highly dependent on the throughflow of granulate, such that every variation of capacity, and also variation of the granulate shape, requires modifications to be made of the inner structure of the apparatus with corresponding shut-down periods.

It is the object of the present invention to provide a simple process and an uncomplicated apparatus for carrying out the process for the aftercondensation of polymers (also termed "granulate" in the specification, although coarser powders may be involved, too), especially of moist and amorphous polymers, wherein drying and recondensation are performed in a single apparatus, without transfer elements or even conveying or metering elements being installed between the separate zones in which these processes take place. For the purpose of performing the recondensation in solid phase, this apparatus is contemplated to provide for as narrow as possible a retention time distribution of the separate granulate particles, while agglutination due to thermal stress during the crystallization and the subsequent drying and recondensation should be prevented from occurring, and the reaction gases should lend themselves to be removed during the aftercondensation. According to a further object, energy consumption and the consumption of circulating (inert) gas should be as low as possible, and this object can be solved more readily by a single apparatus, compared to a plurality of apparatus units connected in series. Dust formation should be low, and it should be possible to remove dust from the granulate, particularly before commencement of the recondensation. The apparatus should be adapted to be easily adjusted to varying throughput capacities without necessitating interruption of operation.

According to the present invention, this object is solved by the characterizing features of the main claim and the parallel apparatus claim in combination with the features according to the preamble.

The process according to the invention in advantageous manner permits to dry and recondense amorphous and moist polymer in a granular or powderous form within a reactor, whereby agglutination of discrete granulate particles is prevented by the agitating element provided in the upper portion of the reactor.

Pre-crystallization of the moist and amorphous granulate in a separate reactor is not longer necessary. Of particular advantage is that the apparatus according to the invention shows an uncomplicated construction and can be readily adapted to varying throughput capacities, thereby to ensure highly economical or efficient operation at low cost. Due to the only cyclic movement of the agitating elements, dust formation is reduced and unnecessary abrasion is avoided.

The apparatus according to the invention is illustrated in the drawings and explained in greater detail in the following specification in connection with the process according to the invention.

Figure 2:
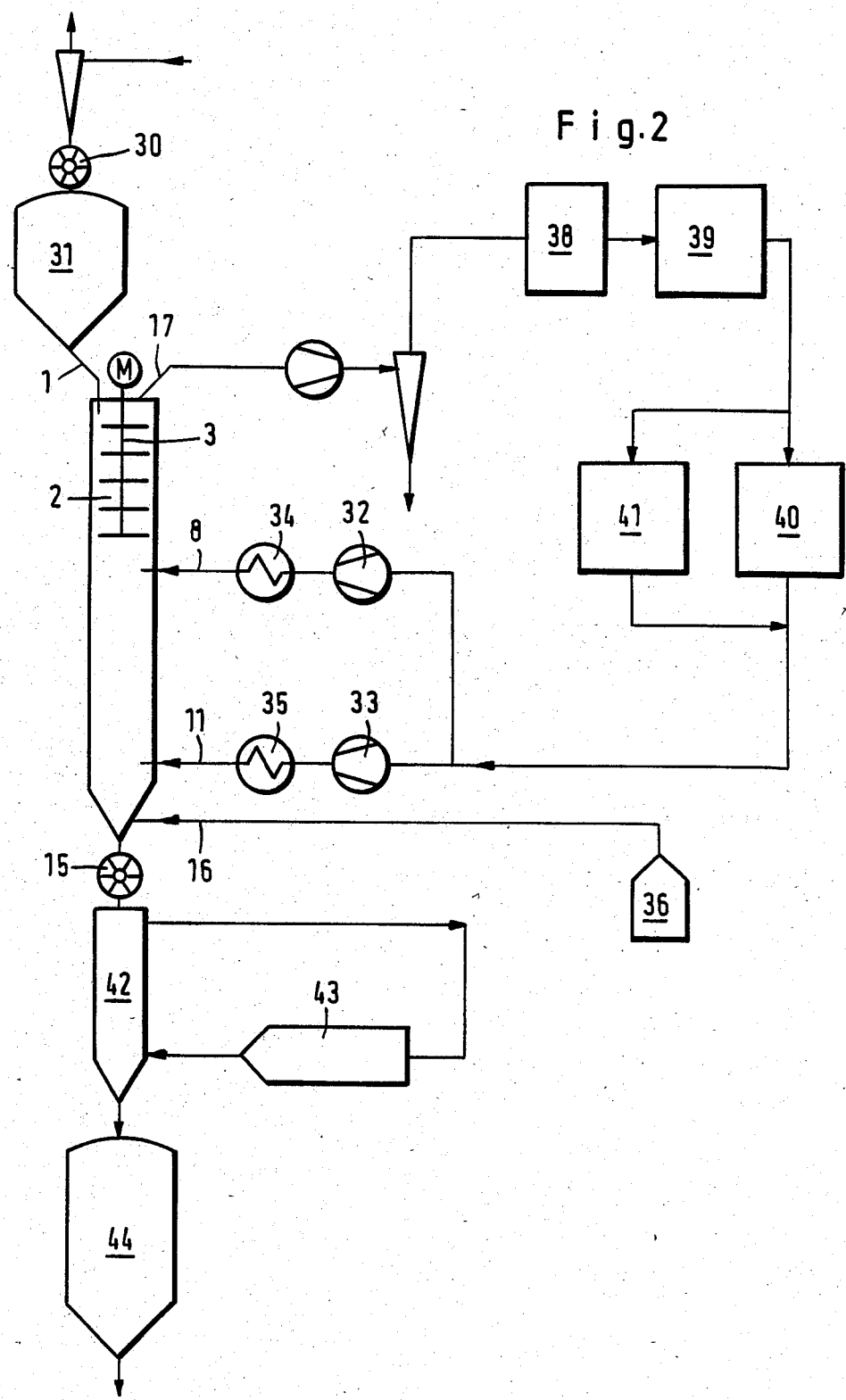

In the drawings:

FIG. 1 is a longitudinal sectional view of the apparatus according to the invention; and FIG. 2 shows the apparatus according to the invention as positioned within an overall system for carrying out the process for the aftercondensation.

According to FIG. 1, the granulate is introduced into the reactor 2 through a feed pipe 1. In the upper portion of the reactor, agitating elements for stirring the granulate are disposed. Here, an agitator comprising a rotary shaft 3 having flat stirring bars 4 mounted thereon is shown. Alternatively, other structures, such as screen trays or plates, may be used. The agitator is driven externally in well-known manner. The granulate moves in downward direction within the shaft. Approximately at a level equal to one-half of the height of the cylindrical portion, there are means for the supply of hot gas. Such means for supplying gas volumes into a granulate fill are conventional.

For example, in the left part of the shaft, gas is supplied via a manifold or baffle cross 5 in which the gas flows in at 7 from an exterior manifold chamber 6 through the wall of the shaft into the cross arms, to flow out in downward direction and thereafter to flow upwards in counter-current relation to the granulate flow. It is indicated in exemplary manner in the right hand part of the shaft according to FIG. 1 that the gas flows in again from the manifold chamber 6 through openings in the shaft wall and directly into the granulate to spread out upwards across the cross-section in the further course of its flow. The manifold chamber 6 is fed through a feed line 8.

In the lower portion, approximately at the end of the cylindrical part, there are provided further means for the supply of hot gas. These means are shown at 9 in the form of a conical body through the wall openings 10 of which the hot gas flows out to spread out upwards across the granulate fill.

Hot gas is supplied from line 11 through a connection line 12 to the conical body 9. For reasons of symmetry and for the mounting of body 9, extra struts 13 are attached.

The cylindrical part of the shaft (tube) is heated, either by means of not illustrated electrical heater rings, or in well-known manner by a heat carrier medium flowing between the wall of the reactor 2 and an outer shroud (not shown). The uniform heating by special measures in the course of flow of the heat carrier medium is well known and need not be discussed any further here. Heating of the shroud may terminate in the upper portion at the position where the granulate has its highest filling level. This is about the position of the end of the feed pipe 1. In the lower portion, heating is effected up to a point slightly below the lower gas supply means. No further heating is required in the part therebelow. In the lower portion 14, the shaft or column converges. The granulate is discharged by means of a discharge device 15, for example, a vane-type discharge valve. Indicated between lower portion 14 and the vane-type discharge valve is a facility for feeding fresh gas through a feed pipe 16. The fresh gas introduced at this point flows mainly in upward direction; preferably, gas-tight discharge devices are used at 15. The fresh gas acts to cool the granulate. When the shaft shroud is not heated in the lower portion 14, and this portion further is not thermally insulated, initial cooling of the granulate takes place already in this region.

Fresh gas is introduced into the shaft-type reactor through the feed pipe 16. In most processes for the aftercondensation of polymers, inert gases, such as nitrogen, are employed. For reasons of economics, these gases are circulated. However, gas volumes leak out from these circulation systems. In operation of the apparatus according to the invention, certain volumes of leakage gas escape through the feed pipe 1 and also through the outlet pipe 18 below the discharge device 15.

FIG. 2 illustrates the use of the apparatus according to the invention in an overall system for the aftercondensation of polymeric granulate. Through a metering and gas blocking device 30, the moist, amorphous and only slightly crystallized granulate in its state as delivered from the polymer production is filled into a receptacle 31, to automatically flow through the feed pipe 1 into the shaft-type reactor 2. Hot gas feed lines 8 and 11 are fed by blowers 32 and 33 and subsequently connected heat exchangers 34 and 35. In the illustrated embodiment, the fresh gas supply (feed line) 16 is fed from a liquid nitrogen reservoir 36. The gas flowing out through connection line 17 through blowers (pumps) is initially cleaned from dust components by cyclones and/or fine-mesh filters 38, 39; subsequently, the separation of ethylene glycol (EG) and acetaldehyde, indicated in diagrammatic form only, is effected. Thereafter, the gas is dried at 40 to remove water which has been removed from the granulate during drying in the upper portion of the apparatus 2. Frequently, the enrichment of the gas by oxygen which is constantly introduced into the circulation system through leaks in this system and in any case together with the granulate, is removed at 41 by corresponding conventional methods.

Then, as shown in FIG. 2, the gas flow is branched to the two blowers 32 and 33, whereupon the gas flows back into the shaft-type reactor through lower and upper gas feed lines 11 and 8, respectively.

One possible connection only of the circulation system is shown in FIG. 2. An alternative is that the dust-freed gas is fed directly to the blower 32 downstream of filters 38, 39, whereby the gas is directly reintroduced into the granulate-filled shaft or column, while only the other portion is constantly cleaned of disturbing admixed gas components and water.

The granulate introduced through feed pipe 1 spreads out flatly across the full cross-section under the action of the moving agitating element. Heating of the granulate is commenced thereafter, and pre-drying and crystallization commence at the same time. Then, the material is dried and recondensed in the vicinity of the upper gas feed line 8, and in any case below the latter. In contrast with the conventional processes, the regions in which these four fundamental operations take place are not definitely separated from each other in the apparatus according to the invention. Rather, transition areas exist between these regions. Below the discharge device 15, there may be provided a cooling path, indicated in FIG. 2 by the small-diameter intermediate receptacle 42. In the latter, the granulate may be cooled, in addition to cooling by convection to the ambient atmosphere, also through the container wall by means of a gas. When, as mentioned, pre-cooling has already taken place in the lower portion of the shaft-type reactor 2, cooling with the aid of dry air may be effected here. A circulation system is shown schematically by the conduit system 43. The granulate is thereafter conveyed away via silos or storage bins 44 or the like. However, the granulate may be fed directly to the molding stage at which, for example, PET granulate is molded into bottles. In this instance, the granulate can be supplied to the blow-molding machine directly and without cooling.

EXAMPLE 1

Polyethyleneterephthalate (PET) was supplied as a granulate having the dimensions of 4×4×2 mm or 4 mm of diameter and 4 mm of length to a shaft-type reactor 2 according to the invention. The granulate had the equilibrium moisture of from about 0.1 to 0.2 percent by weight, and it showed a slightly crystalline, substantially amorphous state. The intrinsic viscosity (i.v.) of the granulate was 0.62, as determined in phenol-tetrachloroethane (1:1) at 20° C. In the upper portion of the shaft-type (columnar) reactor, in addition to its downward movement the granulate was stirred by an agitator at a rate of speed of 3 revolutions/minute. Agglutination of the granulate did not occur, even when the agitator was operated only cyclically in during about 2 to 3 minutes with a stop of 1 minute between the movements.

Nitrogen ($N_2$) was supplied as an inert gas at a temperature of 230° C. at 8, and at a temperature of 245° C. at 11. The ratio between the quantity of granulate and the volume of inert gas, each based upon weight, was 0.2:1. The retention time of the granulate between the introduction into the shaft-type reactor 2 in position 1 to the outflow below the discharge element at 18 amounted to 5 hours. The viscosity of the granulate increased from an initial value of 0.62 to a value of 0.79. The acetaldehyde content of the polymer was less than 2 ppm. The granulate was suitable, without any further after-treatment, for direct molding to form bottles for receiving carbon dioxide-containing beverages.

We claim:

1. A process for the crystallizing, drying and after-condensation of polycondensates, such as polyester, comprising: continuously introducing especially amorphous and moist polymer into a reactor in a granular or pulverous form to flow downwards through the reactor under gravity; passing a hot gas through the reactor in counter-current flow, the upper portion of the reactor being formed as a single, continuous shaft or column; simultaneously crystallizing and pre-drying the polymer granulate while moving or stirring the polymer by agitation relative to its downward movement; and subsequently drying and aftercondensing the polymer granulate without separation or interruption in a further, lower portion of the continuous shaft or column.

2. The process of claim 1, including introducing a first hot gas stream into a lower portion of the shaft or column; and introducing a second hot gas stream, normally of a lower temperature than said first hot gas stream, into the shaft or column above the point where said first hot gas stream is introduced, at a level equal to approximately one-half of the height of the shaft or column.

3. The process of claim 1 or 2, including cooling the granulate below the point of introduction of said first hot gas stream into the shaft or column.

4. The process of claim 2, including metering the volume of the second hot gas stream in such a manner that fine dust components are carried away.

5. The process of claim 2, including circulating the supplied gas, and freeing the gas of moisture, reaction gases, dust and gases which would disturb the reaction, after the outflow of gas from the reactor.

6. The process of claim 5, including introducing fresh gas into the reactor below the point of introduction of said first hot gas stream to make up for gas volume lost during circulation of the gas and for cooling of the polycondensate.

* * * * *

UNITED STATES PATENT AND TRADEMARK OFFICE
CERTIFICATE OF CORRECTION

PATENT NO. : 4,584,366
DATED : April 22, 1986
INVENTOR(S) : LÜDER GERKING et al

It is certified that error appears in the above-identified patent and that said Letters Patent are hereby corrected as shown below:

Column 1, line 53:

After "U.S. Patent 3,821,171 for the", entire line --recondensation of polyamide, is not sufficient for the-- has been omitted.

Column 2, line 5:

Line beginning "29 290" should read --59 290--.

Signed and Sealed this

Eighth Day of July 1986

[SEAL]

Attest:

DONALD J. QUIGG

Attesting Officer

Commissioner of Patents and Trademarks